US012798638B2

(12) United States Patent
Hernandez Canseco

(10) Patent No.: US 12,798,638 B2
(45) Date of Patent: Nov. 17, 2026

(54) SYSTEM AND METHOD FOR ANALYZING RAILWAY RELATED DATA

(71) Applicant: KONUX GMBH, Munich (DE)

(72) Inventor: Andres Hernandez Canseco, Edingen-Neckarhausen (DE)

(73) Assignee: KONUX GMBH, Munich (DE)

( * ) Notice: Subject to any disclaimer, the term of this patent is extended or adjusted under 35 U.S.C. 154(b) by 1108 days.

(21) Appl. No.: 17/798,203

(22) PCT Filed: Feb. 7, 2020

(86) PCT No.: PCT/EP2020/053182

§ 371 (c)(1),
(2) Date: Aug. 8, 2022

(87) PCT Pub. No.: WO2021/155950

PCT Pub. Date: Aug. 12, 2021

(65) Prior Publication Data

US 2023/0073361 A1 Mar. 9, 2023

(51) Int. Cl.
*B61L 27/57* (2022.01)
*B61L 23/04* (2006.01)
(Continued)

(52) U.S. Cl.
CPC ............. *B61L 27/57* (2022.01); *B61L 23/045* (2013.01); *B61L 23/047* (2013.01);
(Continued)

(58) Field of Classification Search
CPC .......... B61L 27/57; B61L 27/50; B61L 27/10; B61L 27/16; B61L 27/40; B61L 27/53;
(Continued)

(56) References Cited

U.S. PATENT DOCUMENTS 10,354,644 B1 * 7/2019 Gao ........................ G10L 15/02
11,308,361 B1 * 4/2022 Aitken ...................... G06T 5/73
(Continued)

FOREIGN PATENT DOCUMENTS

CN 102343922 A * 2/2012
CN 102343922 B 6/2013
(Continued)

OTHER PUBLICATIONS

Berlin, E. et al., (2012). "Trainspotting: Combining fast features to enable detection on resource-constrained sensing devices.", 2012 Ninth International Conference on Networked Sensing (INSS), pp. 1-8 doi: 10.1109/inss.2012.6240520 (Year: 2012).*
(Continued)

*Primary Examiner* — S. Joseph Morano
*Assistant Examiner* — James William Jones
(74) *Attorney, Agent, or Firm* — Tarolli, Sundheim, Covell & Tummino LLP

(57) ABSTRACT

The present invention relates to a method and system using multiple data sources for unsupervised and/or semi supervised algorithms to derive features such as speed of the train, length of the train, type of wagons, etc. Thus, classifying train categories. The invention provides a method and a system configured for analysing railway related vibration data. The invention is configured for collecting at least a first dataset from a sensor applied to the railway infrastructure. Further, it is configured for collecting at least a second dataset from a scheduling component. The at least one subset of the first dataset is curated with the second dataset to obtain first training database. The invention further discloses a method comprising the step of predicting at least a likelihood of one train belonging to at least one train-type.

19 Claims, 11 Drawing Sheets

(51) Int. Cl.

| | |
|---|---|
| ***B61L 25/04*** | (2006.01) |
| ***B61L 27/04*** | (2006.01) |
| ***B61L 27/10*** | (2022.01) |
| ***B61L 27/16*** | (2022.01) |
| ***B61L 27/40*** | (2022.01) |
| ***B61L 27/50*** | (2022.01) |
| ***B61L 27/53*** | (2022.01) |
| ***G06N 3/045*** | (2023.01) |
| ***G06N 3/048*** | (2023.01) |
| ***G06N 3/08*** | (2023.01) |
| ***G06N 3/082*** | (2023.01) |
| ***G06N 3/088*** | (2023.01) |

(52) U.S. Cl.

CPC ............. *B61L 23/048* (2013.01); *B61L 25/04* (2013.01); *B61L 27/04* (2013.01); *B61L 27/10* (2022.01); *B61L 27/16* (2022.01); *B61L 27/40* (2022.01); *B61L 27/50* (2022.01); *B61L 27/53* (2022.01); *G06N 3/045* (2023.01); *G06N 3/048* (2023.01); *G06N 3/08* (2013.01); *G06N 3/082* (2013.01); *G06N 3/088* (2013.01)

(58) Field of Classification Search

CPC ...... B61L 27/04; B61L 23/045; B61L 23/048; B61L 23/047; G06N 3/08; G06N 3/048; G06N 3/082; G06N 3/045; G06N 3/088

USPC ...................................................... 246/167 R

See application file for complete search history.

(56) References Cited

U.S. PATENT DOCUMENTS

| | | | | |
|---|---|---|---|---|
| 2013/0248659 A1 | 9/2013 | Lingvall | | |
| 2014/0277824 A1* | 9/2014 | Kernwein | B61K 9/08 | 701/1 |
| 2016/0082991 A1* | 3/2016 | Warta | B61L 27/53 | 246/167 R |
| 2018/0188733 A1* | 7/2018 | Landola | G05D 1/024 | |
| 2019/0161919 A1* | 5/2019 | Gilbert | G01N 29/043 | |
| 2019/0197923 A1* | 6/2019 | Jovenall | G09B 29/007 | |
| 2019/0272752 A1* | 9/2019 | Alesiani | G08G 1/0129 | |
| 2019/0332943 A1* | 10/2019 | Obradovic | G06N 3/082 | |
| 2019/0355347 A1* | 11/2019 | Arik | G06N 20/20 | |
| 2020/0079405 A1* | 3/2020 | Martell | B61L 27/53 | |
| 2021/0142162 A1* | 5/2021 | Jeon | G06N 3/049 | |
| 2021/0334656 A1* | 10/2021 | Sjögren | G06N 3/08 | |
| 2022/0385545 A1* | 12/2022 | Xiao | H04L 41/40 | |

FOREIGN PATENT DOCUMENTS

| | | | | |
|---|---|---|---|---|
| EP | 1274979 B1 * | 1/2004 | B61L 23/047 |
| GB | 2500303 A * | 9/2013 | G06F 16/35 |
| WO | 2019185873 A1 | 10/2019 | |

OTHER PUBLICATIONS

International Search Report dated Oct. 30, 2020 for corresponding International Application No. PCT/EP2020/053182.

Berlin, E. et al., (2012). "Trainspotting: Combining fast features to enable detection on resource-constrained sensing devices.", 2012 Ninth International Conference on Networked Sensing (INSS), pp. 1-8 doi:10.1109/inss.2012.6240520.

Examination No. 2, Notice of Reasons for Refusal for corresponding Application No. 2022-540922, dated Dec. 22, 2023, pp. 1-2.

Trainspotting: Combining Fast Features to Enable Detection on Resource-constrained Sensing Devices, Eugen Berlin and Kristof Van Laerhoven, pp. 1-8.

Communication pursuant to Article 94(3) EPC in regard to Application No. 20 704 286.2-1201, dated Apr. 30, 2026, Applicant—Konux GmbH, 11 pages.

* cited by examiner

| | precision | recall | f1-score | support |
|---|---|---|---|---|
| Train 1 | 0.98 | 0.99 | 0.99 | 1769 |
| Train 2 | 0.74 | 0.87 | 0.80 | 597 |
| Train 3 | 0.99 | 0.99 | 0.99 | 2025 |
| Train 4 | 0.98 | 0.99 | 0.99 | 553 |
| Train 5 | 0.95 | 0.97 | 0.96 | 473 |
| Train 6 | 1.00 | 1.00 | 1.00 | 412 |
| Passenger | 0.95 | 0.92 | 0.94 | 5056 |
| Unknown | 0.73 | 0.79 | 0.76 | 767 |
| weighted avg | 0.94 | 0.94 | 0.94 | 11652 |

6a

6b

7a

7b

8a

8b

SYSTEM AND METHOD FOR ANALYZING RAILWAY RELATED DATA

RELATED APPLICATIONS

The present application is a U.S. National Stage application under 35 USC 371 of PCT Application Serial No. PCT/EP2020/053182, filed on 7 Feb. 2020, the entirety of which is incorporated herein by reference.

FIELD

The invention relates to a system and a method for statically extracting and monitoring railway related data, particularly using the track vibrations induced by a passing train.

BACKGROUND

With the increase in rail traffic, rail system is under increasing pressure to keep the trains running on time and for longer. Safety, availability and reliability are the main components of a comfortable rail traffic. A system and method for analysing the rail related data which fully integrates the type of the train and the location will help in understanding delays, infrastructural malfunctioning, etc. The International Union of Railways (IUR), the Community of European Railways (CER), the International Union of Public Transport (IUPT) and the Union of European Railway Industries (UNIFE) have all agreed, within the White Paper for European Transport, to attempt to increase the market share of goods traffic on rail from 8% in 2001 to 15% in 2020 (European Union, 2011). This will of course lead to an increase in railway traffic hence number of trains. Each train has different characteristics and knowing the type of a train will help in establishing the state of both the train itself and of the track, as well as knowing ancillary information about the train, such as its location, ETA, speed, collision susceptibility, etc.

For a ground-based sensor, conventional timetable operation methods for railway traffic control gives no direct positive confirmation that the measurement corresponds to a particular train as the schedule only provides timestamps at particular control points, which can differ from sensor locations. Furthermore, as there are deviations between the actual traffic and the planned schedule, relying primarily on the schedule requires an inconvenient collection of data from a different source in the organization, and posteriori tagging of such information, which might be delayed by days or weeks, hence preventing real-time assessments. For cargo trains, the schedule-based approach to identify trains presents even more problems, as it will not specify the exact type and number of wagons, but rather only a general type and a maximum reserved length.

As the number of trains increases so will the data one can use from them. For example, the vibrations induced by the motion of the train via the interaction between wheel and rail tracks. This vibrational data can be used to extract a lot of information, for example, rail and track bed condition, vehicle suspension, wheel condition, speed, weight of the vehicle, material used in tracks, depth to water table, frost depth, type of the vehicle, etc.

A system and/or a method which will be able to analyse this vibration will not only be able to provide the information about the wheels and the rail tracks but also the vehicle passing by and the traffic associated with the vehicle. As a person skilled in art may now infer that the nature of vibrations and the associated data will differ depending on the point where they are recorded. A few vibration/oscillation-based studies of railway related data have been done:

For example, EP1274979B1 relates to a method for monitoring the travelling behaviour of rail vehicles, according to which an oscillation behaviour of at least one vehicle component is monitored by detecting at least one oscillation pattern and comparing the same with at least one reference oscillation pattern, whereby a natural oscillation of at least one vehicle component is monitored. The invention also relates to a device for monitoring the travelling behaviour of rail vehicles, whereby at least one oscillation pick-up is mounted on at least one vehicle component. To this end, means are provided for evaluating the signal pattern, which is supplied by at least one oscillation pick-up, whereby characteristic values of the oscillation patterns of the at least one vehicle component are detected and compared with reference characteristic values of the oscillation patterns of a natural oscillation of the vehicle component.

CN102343922 provides an on-line monitoring system for vibration characteristics of a rapid railway turnout based on a wireless sensor network and relates to the technical field of safety monitoring of rapid railway infrastructures. The wireless sensor network serves as the core of a special system. The on-line monitoring system comprises a data monitoring unit for front-end three-shaft acceleration wireless sensor, a front-end data collecting unit for the wireless sensor network and a server terminal, wherein the data monitoring unit for front-end three-shaft acceleration wireless sensor is used for on-line acquiring a vibration data of a rapid turnout when a train passes by and sending the vibration data in a wireless mode; the front-end data collecting unit for the wireless sensor network is used for receiving the data sent by the data monitoring unit in real time and collecting and transferring the data; and the server terminal is used for receiving the data from the front-end data collecting unit, permanently storing the data, analysing and calculating to obtain a train speed and a load condition according to the acceleration data, comparing the train speed and the load condition with a historic statistical data, and prompting and alarming for parameters which deviate from the historic statistical data and exceed a certain scope, thereby supporting the safety running of the rapid turnout. Combined with a conventional test and mechanical analysis method, the on-line monitoring system can be used for monitoring the rapid railway turnout and providing a data basis for maintaining and design optimizing of the turnout.

All these documents are herein incorporated by reference.

SUMMARY

In light of the above, it is an object of the present invention to overcome or at least alleviate the shortcomings of the prior art. More particularly, it is an object of the present invention to provide a method and system for tracking and recognizing a type of the train by analysing railway acceleration related vibrational data. This object is attained with the embodiments in accordance with the present specifications and/or subject matter in accordance with the embodiments and/or claims.

The present invention further relates to a method and system using multiple data sources for unsupervised and/or semi supervised algorithms to derive features such as speed of the train, length of the train, type of wagons, etc. Thus, classifying train categories.

In a first embodiment a method for analysing railway related vibration data is disclosed. The method comprises the step of collecting at least a first dataset from a sensor applied to the railway infrastructure. The method also comprises the step of collecting at least a second dataset from a scheduling component. The method comprises the further step of curating at least one subset of the first dataset with the second dataset to obtain a first training database. Further, the method comprises the step of predicting at least a likelihood of one train belonging to at least one train-type.

The sensor can comprise one or a plurality of sensors forming a sensor device. The sensors can be measuring the same type of data or different. For example, the sensor can measure vibrations of railways due to trains passing on them. The sensor may be configured to automatically push sensor data to at least one server. The term 'server' can be a computer program and/or device and/or plurality of each or both that provides functionality for other programs or devices. Server can be a local server which may be configured to railway infrastructure or a remote server. Servers can provide various functionalities, such as sharing data or resources among multiple clients, or performing computations and/or storage functions. A single server can server multiple clients, and a single client can use multiple servers. A client process may run on the same device or may connect over a network to a server on a different device, such as a remote server or the cloud. The server can have rather primitive functions, such as just transmitting rather short information to another level of infrastructure, or can have a more sophisticated structure, such as a storing, processing and transmitting unit.

In the present disclosure, the term server can indicate a remote server a collection of servers and/or a cloud server, Generally, the central server indicated computer resources that are generally not in the geographical vicinity of the sensor. In some embodiments method may further comprise the step of connecting the at least one sensor to the at least one server. In some embodiments the server and/or the sensor may comprise a processing component. The processing component can comprise a computing device with a CPU and connectivity capabilities via preferably at least two different communication protocols (such as WIFI, WLAN, GSM, LTE, Bluetooth, NFS, LoRa, Narrowband IoT, sub-GHz wireless transmission or others). A skilled person will recognize that various different devices can server as the processing component. Further, the processing component may comprise a memory component. The memory component can be a storage server and/or a physical storage device.

In some embodiments, the processing component and the sensor can comprise separate devices and communicate via wireless short-range communication protocol. That is, the two can be physically distinct devices placed in the general vicinity of each other. This configuration can be particularly advantageous, as the sensors generally need to be placed in the immediate vicinity of the rail tracks, such as on the rail bed. That means that the sensors can require housing configured to withstand the harsh conditions of this placement location. The processing component, on the other hand, can be placed in more favourable conditions nearby. For example, the processing component can be placed indoors in a station, or within a booth housing other railway component. Communication via short range protocol can comprise, for example Bluetooth® and/or Bluetooth® Low Energy (BLE) (other possible short-range protocols include, but are not limited to LoRa, Narrowband IoT, WLAN, sub-GHz wireless transmission communication). This type of communication can be very energy effective, and therefore optimize energy expenditure of the sensors.

In some embodiments, the sensor may be automatically submitting the first dataset and at least a sensor ID to the server. The sensor can be an accelerometer configured to measure railway sleeper acceleration. This can advantageously allow to derive a plethora of information relating to railway components from the different accelerations detected. Each sensor may comprise the sensor ID. The sensor ID may be based on the information related to the surrounding railway infrastructure. The sensor ID may also comprise a timestamp of when the first dataset was recorded. This can be particularly advantageous to get information about the physical environment of the sensor, such as temperature, weather, rail traffic, etc. In some embodiments the sensor ID may be the code of the station nearest to the sensor.

In some embodiments the method comprises the step of extracting the second dataset from the scheduling component. The scheduling component may be configured to automatically update a schedule information of a train at a station. The processing component may further collect this schedule information and store it. For example, a train T1 is scheduled to arrive at a station S1 at 14:00 the processing component can automatically pull this information as the second dataset. In a further embodiment, the processing component may pull the first dataset from the sensor placed near the station and curate the first and the second dataset. In some embodiments the second dataset may be the truth set. The processing component may further apply machine learning techniques on the first dataset and predict the likelihood of the train being a certain type. In such embodiments the second dataset may be used as the truth set. The second dataset may also be used for labelling at least a part of the first dataset. On the basis of this labelled dataset, in some embodiments, the method can be trained to classify the trains. In some further embodiments only unlabelled first dataset and the second dataset can be used for training.

In some embodiments the first dataset comprises at least one vibration induced by the motion of the train or any rail vehicle. The vibrations measures or frequency measures as measured as first dataset by the sensors may be represented as at least one vibratory acceleration trace. The conversion to acceleration trace may be done to facilitate the information extraction from the first dataset.

In a further embodiment, the processing component may pre-process the first dataset once the first data is fed into the server. In such embodiments the server may also be installed in the sensor. Pre-processing may comprise flagging at least one noisy component of the first dataset. The noisy component may be the long acceleration traces, longer than about 14 seconds. The acceleration traces longer than 14 seconds may be considered to be cargo trains and, in some embodiments, may not be used for the classification process. Further, acceleration traces with a low root-mean-square value, lower than about 0.2 g may not contain enough information and may be flagged. In a further embodiment, the pre-processing may comprise removing at least one exponential wakeup. In such embodiments, the sensors may be equipped with a limited bandwidth mode configured to determine presence or absence of motion. This can be done by fitting an exponential curve to the first few points on the acceleration trace and then removing the wakeup curve from a mixture of wakeup curve and the real signal. As the weight of the real signal will increase as the time goes by. The real signal may comprise the motion of the vehicle.

In some embodiments the pre-processing may further comprise cutting off the edge of the acceleration trace. During measuring, the sensor might be measuring until the signal tapers off to zero which might result into some dead signal which may then be automatically removed by the processing component. The pre-processing may further comprise stretching the at least one first dataset to a pre-determined size and representing the at least one first dataset as a time-frequency spectrogram. The spectrogram can split an acceleration trace or a signal into overlapping windows. Further, a power spectrum density (PSD) of the Fourier transform can be calculated. To obtain constant energy per channel Slaney-style Mel scale can be used. The power spectrum density can then me mapped onto the Mel scale. The next step can be to take the logs of the PSDs at each of the Mel frequencies.

The step of pre-processing may be done may be done before performing the step of feature extraction on the acceleration traces. The time-frequency spectrogram may be the Mel-spectrogram for which the parameters may be generated by performing hyperparameter optimization on a truth set. In some embodiments the processing unit may be configured to perform min-max scaling on the pre-processed acceleration traces. This may be important because the classifier (as described later) can calculate the distance between two points by the Euclidean distance. If one of the features has a broad range of values, the distance will be governed by this particular feature. Therefore, a finite region can be specified so all features can be normalized such that each feature contributes approximately proportionately to the final distance. A global-maxima and/or a global-minima can be then be automatically calculated from an acceleration trace of the first dataset.

In a further embodiment the extraction of feature map may be related to an observed environment of the sensor. The observed environment may comprise the infrastructure, e.g. rail, sleeper, ballast, railway infrastructure surrounding the sensor, which might effect the acceleration traces.

In some embodiments the first dataset may be a first unlabelled dataset. The unlabelled dataset may comprise dataset not comprising any tags with labels identifying characteristics, properties or classifications of the dataset. In some embodiments the processing component may be configured with a neural network component (NN). The NN may be configured to automatically extract at least one feature from the first dataset. The processing unit may learn an embedding for the first dataset for dimensionality reduction by training to ignore noise. These learnings may be used to group, or segment, datasets with shared attributes in order to extrapolate algorithmic relationships. This can identify commonalities in the first dataset and reacts based on the presence or absence of such commonalities in each new piece of data.

In some embodiments the processing component may be down-sampling at least one feature map via convolution. In a further embodiment processing component may be configured to automatically apply at least one activation function to the at least one output feature map. The activation function may be sigmoid function, tanh function or a rectified linear unit (ReLU) function. ReLU can adjust activation values to be within a pre-determined range. The range can be 0-1 or 0 to +∞, etc. The ReLU can be configured to replace all negative pixel values in the feature map by zero. Further, at least one of the extracted features may be used in combination with the second dataset from the scheduling component to label at least one unlabelled dataset. In some embodiments, a split can be applied, and an input feature map can be split into two identical feature maps. One of the feature layers can comprise the sigmoid activation. Sigmoid activation can operate on a sigmoid function. The sigmoid function can be:

$$\phi(Z) = \frac{1}{1+e^{-Z}},$$

where Z can be a vector of the inputs to the output layer.

The processing component may be further generating the first training database comprising of at least one of the first dataset and the first unlabelled dataset and a first labelled data subset. Furthermore, the labels may iteratively extend from the at least one subset of the first unlabelled dataset to at least one nearest sample neighbours as measured in the lower-dimensional feature space. The subset may comprise at least 5% of the first dataset. In a further embodiment, the NN may be learning at least one feature of the train using the first training database and predicting a likelihood of a train being a certain type. The train type may also be predicted by using only per-processed dataset in some embodiments.

In a second embodiment a system configured to automatically classify a train type is disclosed. The system can preferably be configured to perform a method according to the above-discussed method embodiments.

The present technology is also defined by the following numbered embodiments:

EMBODIMENTS

Below, method embodiments will be discussed. The letter M followed by a number abbreviates these embodiments. Whenever reference is herein made to method embodiments, these embodiments are meant.

M1. A method for analysing railway related vibration data, the method comprising the steps of:
- collecting at least a first dataset from a sensor applied to railway infrastructure,
- collecting at least a second dataset from a scheduling component,
- curating at least one subset of the first dataset with the second dataset to obtain a first training database,
- predicting at least a likelihood of one train belonging to at least one train-type.

M2. The method according to the preceding embodiment further comprising the step of connecting the at least one sensor to at least one server.

M3. The method according to any of the preceding embodiments wherein the method comprises the step of facilitating the server with at least one processing component.

M4. The method according to any of the preceding embodiments wherein the method comprises the step of facilitating the sensor with a sensor processing component.

M5. The method according to any of the preceding embodiments wherein the processing component comprises a memory component configured to store at least one of at least the first dataset and the at least second dataset.

M6. The method according to any of the preceding embodiments wherein the sensor processing component comprises a sensor memory component configured to store the first dataset and preferably the second dataset.

M7. The method according to the preceding embodiment further comprising the step of submitting at least one of the first dataset and at least a sensor ID to the server from the sensors.

M8. The method according to any of the preceding embodiments comprising the step of automatically collecting the first dataset, wherein the first dataset comprises vibration signal associated with a motion of a rail vehicle M9. The method according to the preceding embodiment wherein the vibration signal comprises at least one of:

at least frequency data;

at least displacement data;

at least velocity data;

at least acceleration data.

M10. The method according to any of the preceding embodiments further comprising the step of automatically generating at least one acceleration trace associated with the first dataset.

M11. The method according to any of the preceding embodiments comprising the step of automatically transmitting the at least one first dataset from the sensor to the processing component.

M12. The method according to any of the preceding embodiments comprising the step of pre-processing the first dataset by the sensor processing component or the processing component.

M13. The method according to the preceding embodiment wherein the step of pre-processing further comprising at least one of the steps:

flagging at least one noisy component of the first dataset, removing at least one exponential wakeup, cutting off the edge of the at least one acceleration trace, stretching the at least one first dataset to a pre-determined size, representing the at least one first dataset as a time-frequency spectrogram.

M14. The method according to the preceding embodiment wherein the step of flagging comprises automatically deleting at least a pre-determined section of the acceleration trace.

M15. The method according to the preceding embodiment comprising the step of automatically calculating the pre-determined section according to a type of the train.

M16. The method according to any of the preceding three embodiments wherein the step of flagging further comprises altering the acceleration trace when a root mean square (RMS) value of the acceleration is lower than a threshold value.

M17. The method according to any of the preceding embodiments and the features of M13 wherein the step of removing the exponential wakeup comprises alteration of an automatically pre-calculated number of acceleration trace/s from the acceleration trace.

M18. The method according to the preceding embodiment further comprising the step of automatically identifying the pre-generated number preferably by fitting exponential curve to the acceleration trace and differentiating between a real signal and a wakeup curve.

M19. The method according to any of the preceding embodiments further comprising the step of cleaning at least one additive noise, preferably by implementing a wiener filter.

M20. The method according to any of the preceding embodiments further comprising the step of automatically resizing the at least one acceleration trace to a pre-determined standard acceleration trace length.

M21. The method according to any of the preceding embodiments comprising the step of automatically converting the at least one acceleration trace to at least one time-frequency spectrogram.

M22. The method according to the preceding embodiment comprising the step of scaling the at least spectrogram value within a pre-determined region.

M23. The method according to the preceding embodiment comprising the step of generating at least one spectrogram parameter preferably using hyperparameter optimization on at least one pre-determined truth dataset.

M24. The method according to any of the preceding embodiments comprising the step of facilitating the processing component with a neural network (NN) component.

M25. The method according to any of the preceding embodiments and feature of M13 comprising the step of feeding a pre-processed first dataset into the NN component.

M26. The method according to any of the preceding embodiments comprising the step of facilitating the sensor processing component with a sensor neural network (NN) component.

M27. The method according to any of the preceding embodiments comprising the step of extracting at least one feature map from the first dataset.

M28. The method according to any of the preceding embodiments and the features of M13 comprising the step of using the pre-processed first dataset for predicting a likelihood of the train being of a certain type.

M29. The method according to the preceding embodiment further comprising the step of using the at least one of the pre-processed first dataset for embedding the at least one acceleration trace in the feature map.

M30. The method according to any of the preceding embodiments and features of M27 comprising the step of extracting the feature map related to an observed environment of the sensor.

M31. The method according to any of the preceding embodiment comprising the step of facilitating the neural network (NN) component to automatically learn at least one lower-dimensional feature map.

M32. The method according to the preceding embodiment further comprising the step of teaching the NN component the at least one lower-dimensional feature map, further associating at least one weight with at least one distinctive feature of the train.

M33. The method according to any of the preceding embodiments wherein the method comprises the step of automatically calculating at least one nearest sample neighbour in the lower-dimensional feature map.

M34. The method according to any of the preceding embodiments further comprising the step of unsupervised encoding of the at least one spectrogram to the at least one feature map.

M35. The method according to any of the preceding embodiments further comprising the step of down-sampling of the feature map preferably via convolution.

M36. The method according to any of the preceding embodiments further comprising the step of applying at least one activation function to the at least one feature map.

M37. The method according to any of the preceding embodiments and the features of M27 further comprising the step of using the at least one extracted feature map and the second dataset to label the at least one subset of the first dataset.

M38. The method according to the preceding embodiment further comprising the step of generating the first training database comprising a labelled first dataset.

M39. The method according to any of the preceding embodiments and feature of M33 further comprising the step of iteratively extending the label from the at least one subset of the first dataset to the at least one nearest sample neighbour.

M40. The method according to any of the preceding embodiments comprising the step of teaching the at least one NN the at least one feature of the train using the first training database.

M41. The method according to any of the preceding embodiments and features of M31 further comprising the step of predicting a likelihood of a train being of a certain type using the lower dimensional feature map.

M42. The method according to any of the preceding embodiments further comprising the step of predicting a likelihood of the train being of a certain type using the first training database.

Below, system embodiments will be discussed. The letter S followed by a number abbreviates these embodiments. Whenever reference is herein made to sample detection system embodiments, these embodiments are meant.

S1. A train classification system, the system comprising:

a sensor configured to provide at least a first dataset and configured to railway infrastructure, a scheduling component configured to provide at least a second dataset, a server configured to curate at least one subset of the first dataset with the second dataset to obtain a first training database, a processing component configured to classify at least one train type.

S2. The system according to the preceding embodiment wherein the system is configured to execute the method according to any of the method embodiments.

S3. The system according to any of the preceding embodiments wherein the system is configured to enable a bi-lateral data exchange between the server and the sensor.

S4. The system according to any of the preceding embodiments wherein the processing component is installed to the at least one of the at least the server and at least the sensor.

S5. The system according to any of the preceding embodiments wherein the processing component comprises a memory component configured to store at least one of at least the first dataset and the at least second dataset.

S6. The system according to any of the preceding embodiments wherein the first data comprises vibration signal associated with a motion of a rail vehicle.

S7. The system according to the preceding embodiment wherein the vibration signal comprises at least one of:

at least frequency data;

at least displacement data;

at least velocity data;

at least acceleration data.

S8. The system according to any of the preceding embodiments wherein the first dataset comprises at least one acceleration trace.

S9. The system according to any of the preceding embodiments wherein the processing component is configured to pre-process the first dataset.

S10. The system according to any of the preceding embodiments wherein the system is configured to automatically delete at least a pre-determined section of the acceleration trace.

S11. The system according to any of the preceding embodiments wherein the system is configured to fit an exponential curve to the at least one acceleration trace and further automatically differentiate between a real signal and a wake-up curve.

S12. The system according to any of the preceding embodiments wherein the processing component is further configured with a neural network (NN) component.

S13. The system according to any of the preceding embodiments wherein the NN component is configured to extract at least one feature map from the first dataset S14. The system according to the preceding embodiment wherein the neural network component is configured to automatically learn at least one lower-dimensional feature map.

S15. The system according to any of the preceding embodiments wherein the feature is extracted on the basis of an observed environment of the sensor.

S16. The system according to any of the preceding embodiments wherein the NN component is further configured to associate at least one weight with at least one distinctive feature of the train.

S17. The system according to any of the preceding embodiments wherein the processing component is further configured to generate at least one spectrogram from the acceleration trace.

S18. The system according to the preceding embodiment wherein the system is further configured to generate the feature map preferably via unsupervised encoding of the spectrogram.

S19. The system according to any of the preceding embodiments wherein the NN component is configured to down-sample the feature map preferably via convolution.

S20. The system according to any of the preceding embodiments wherein the processing component is further configured to associate at least one activation function with the feature map.

S21. The system according to any of the preceding embodiments wherein the processing component is further configured to generate a label for the at least one subset of the first dataset.

S23. The system according to the preceding embodiment wherein the system is configured to iterate the generate label from the subset of the first dataset to the first dataset.

S24. The system according to the any of the preceding embodiments wherein the processing component is configured to predict a likelihood of the train being of a certain type based on the lower-dimensional feature map.

S25. The system according to any of the preceding embodiments wherein the processing component is configured to predict the likelihood of the train being of a certain type based on the label.

Below, use embodiments will be discussed. These embodiments are abbreviated by the letter "U" followed by a number. Whenever reference is herein made to "use embodiments", these embodiments are meant.

U1. Use of the system according to any of the preceding system embodiments for carrying out the method according to any of the preceding method embodiments.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the orders in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

BRIEF DESCRIPTION OF THE DRAWINGS

FIG. 5 5*a*) is an exemplifying trace of acceleration recorded with a signal tapering off to zero according to the present invention;

Figure 6:
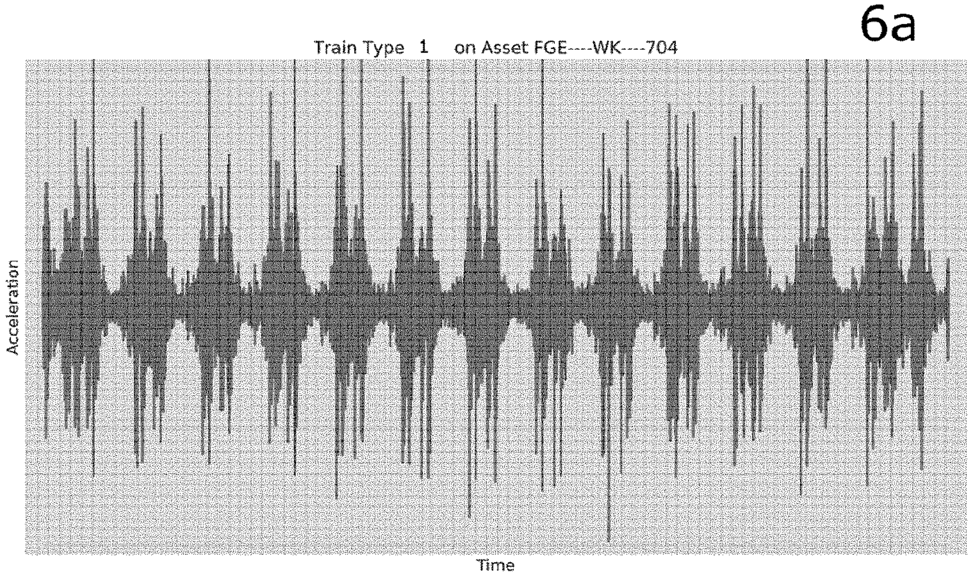
Figure 6:
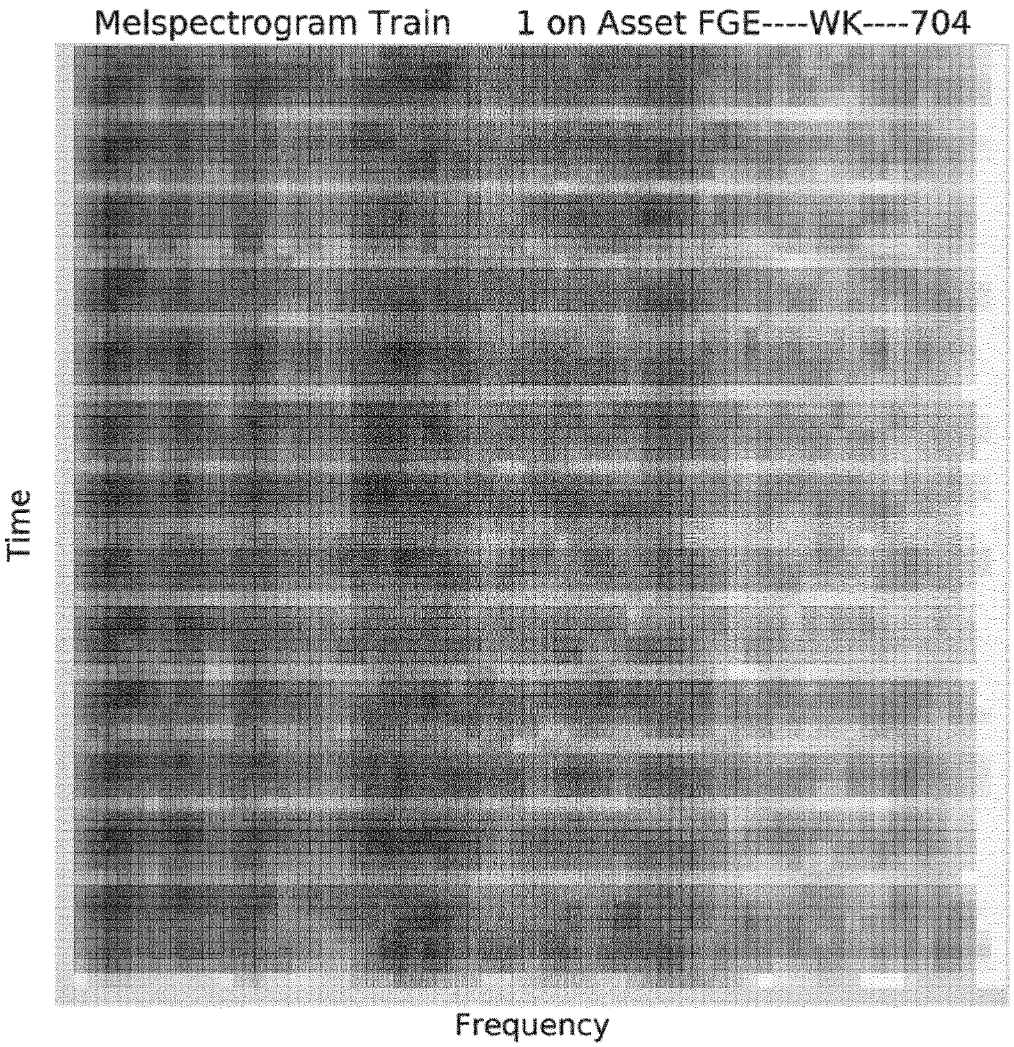
Figure 7:
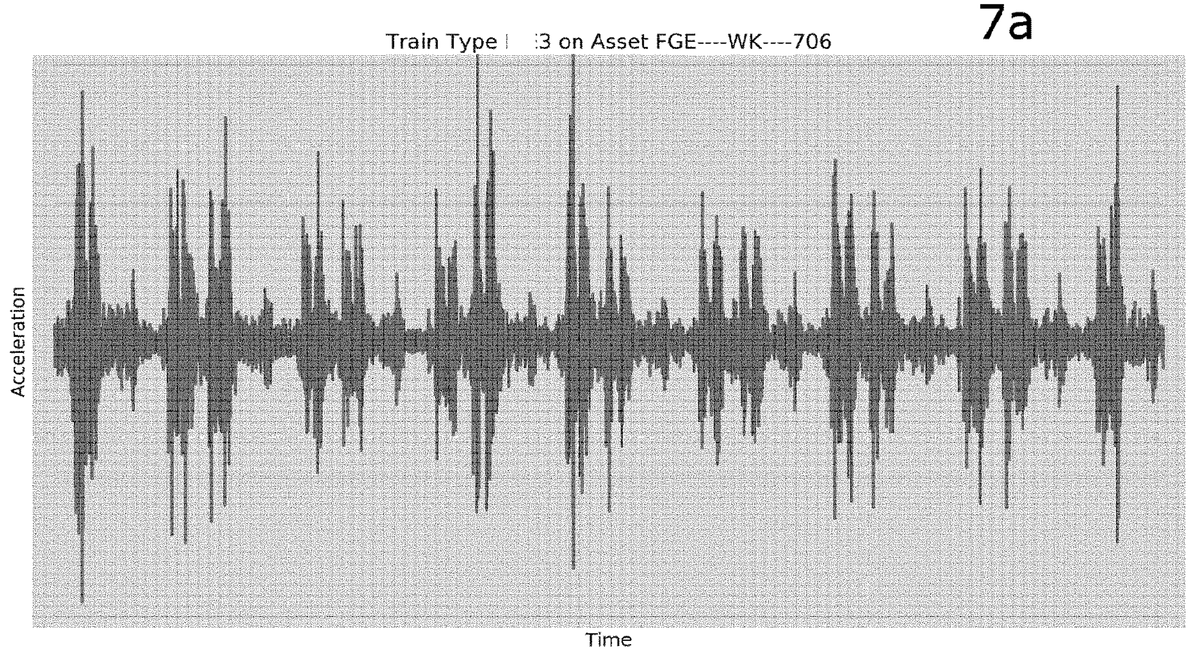
Figure 7:
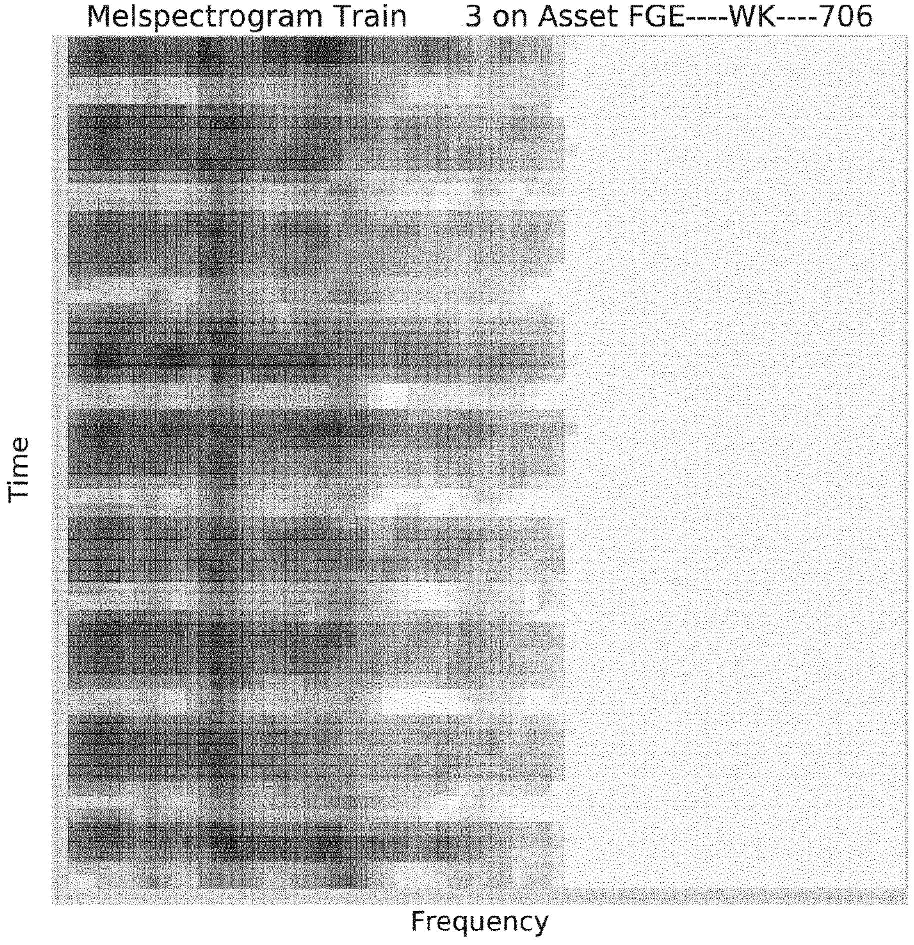
Figure 8:
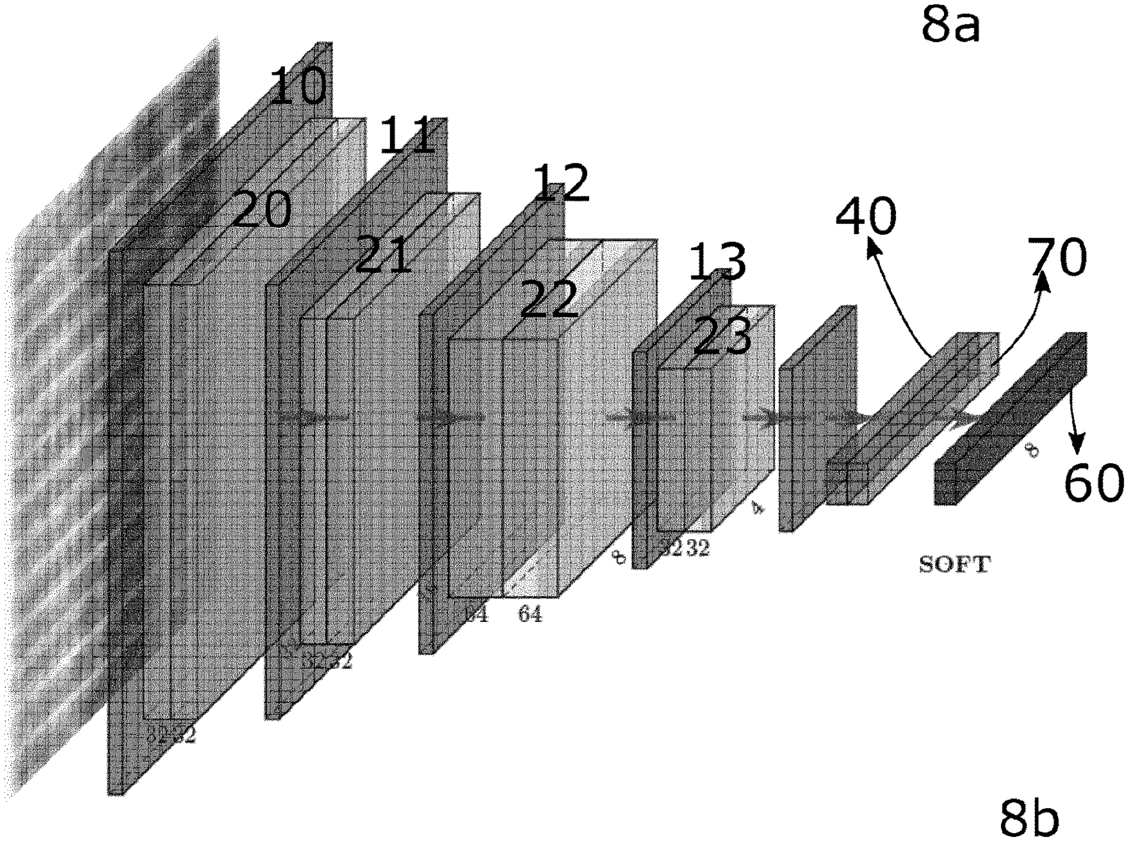
Figure 8:
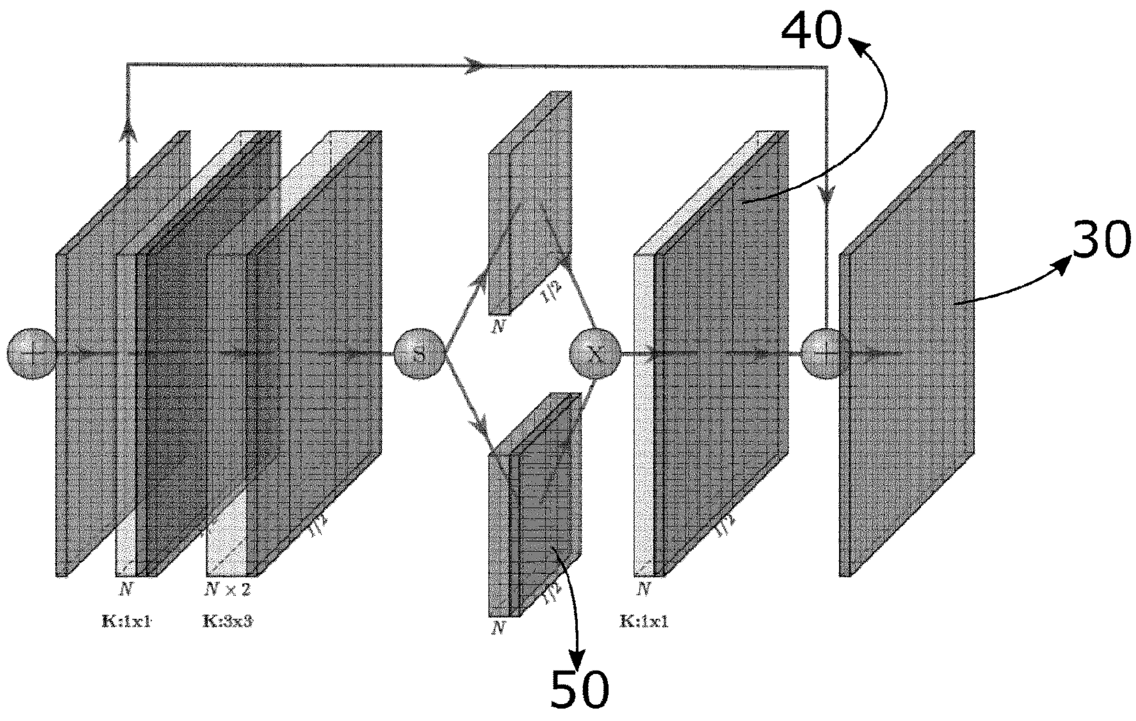

5*b*) is an exemplifying trace of acceleration recorded with a flagged edge;

FIG. 6 6*a*) constitutes an exemplifying trace of acceleration recorded corresponding to a specific kind of train;

6*b*) constitutes an exemplifying representation of the acceleration trace of the train in accordance with the present invention;

FIG. 7 7*a*) constitutes an exemplifying trace of acceleration recorded corresponding to a specific kind of train;

7*b*) constitutes an exemplifying representation of the acceleration trace of the train in accordance with the present invention;

FIG. 8 8*a*) is a visualization of a classifier architecture according to one embodiment;

8*b*) is a visualization of an exemplary filter bank architecture

Figure 9:
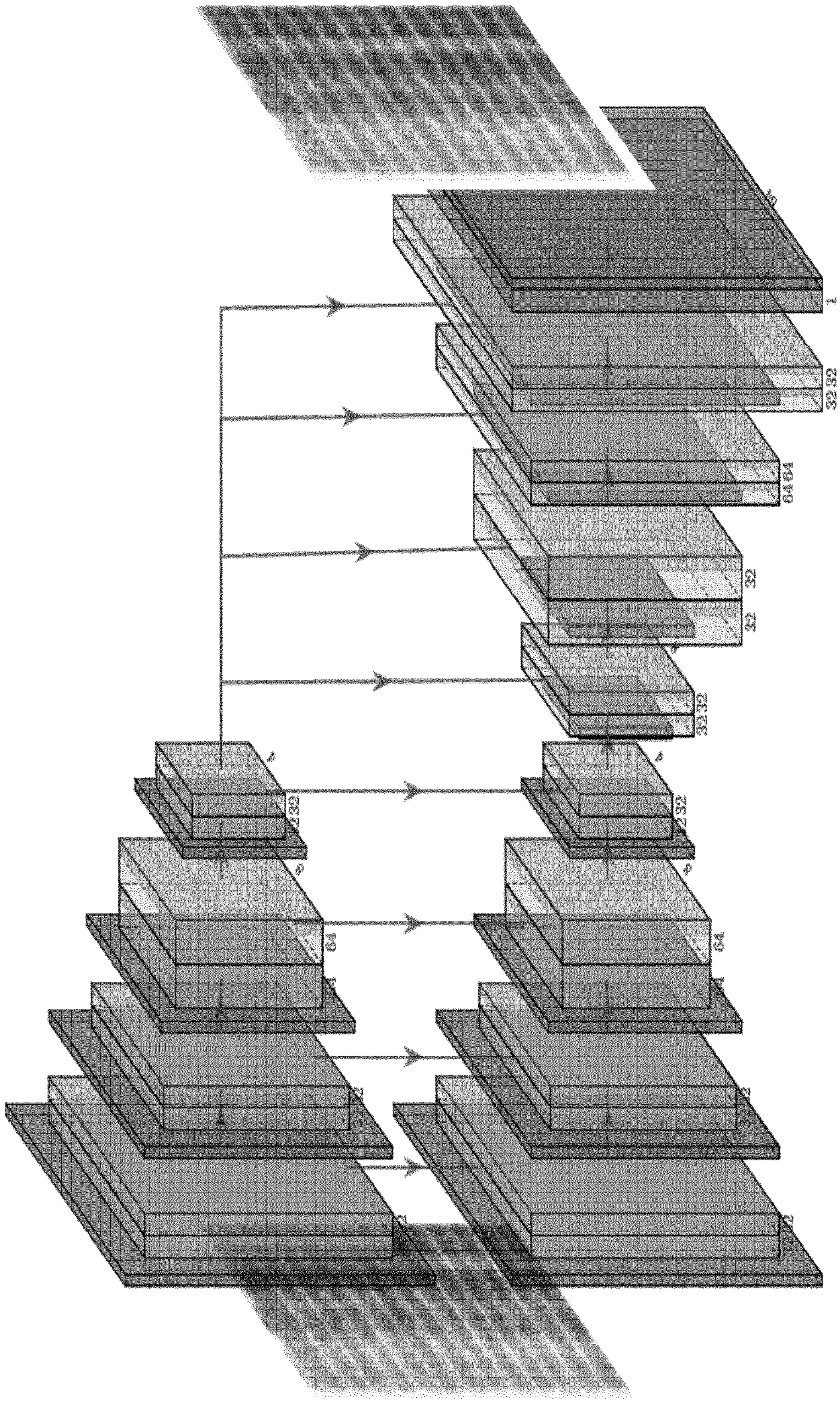
Figure 10:
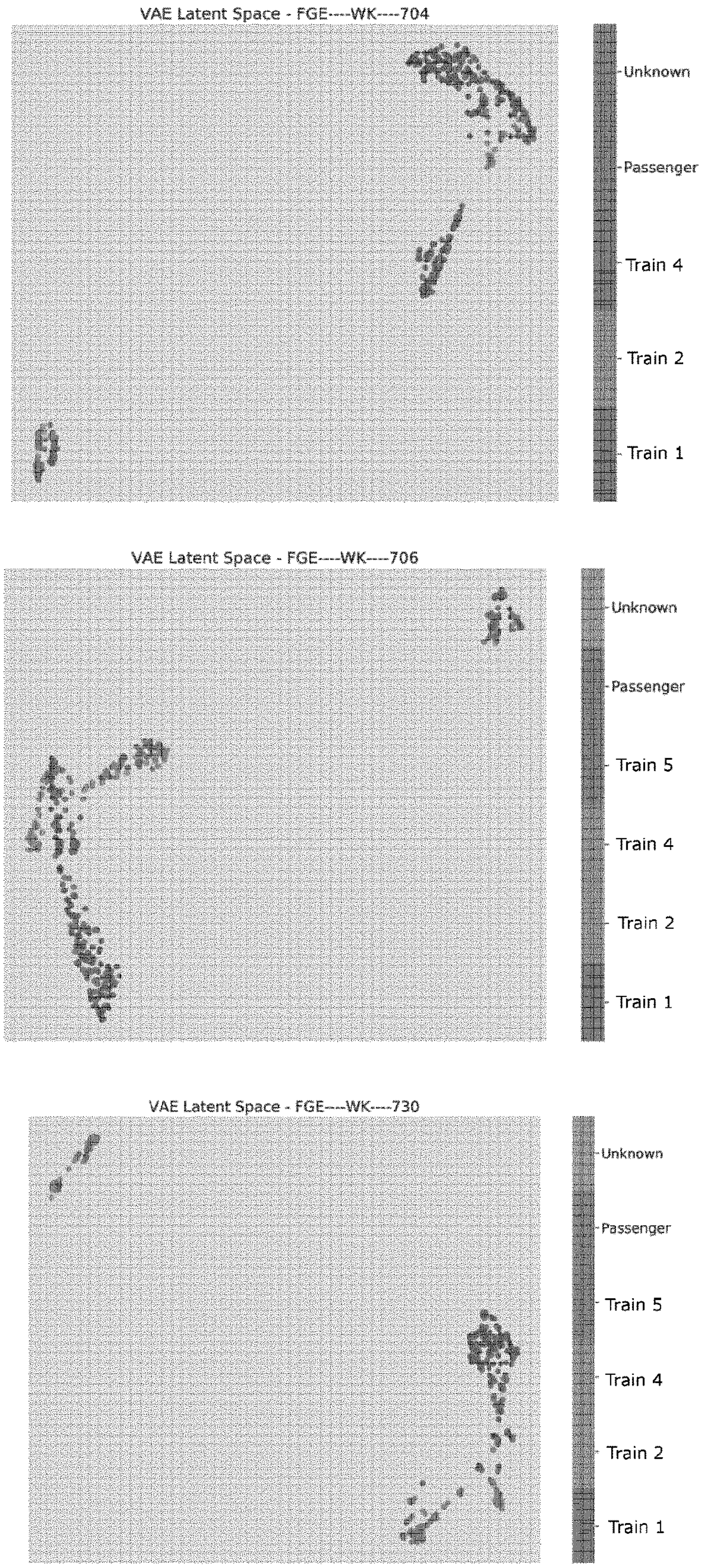
Figure 11:
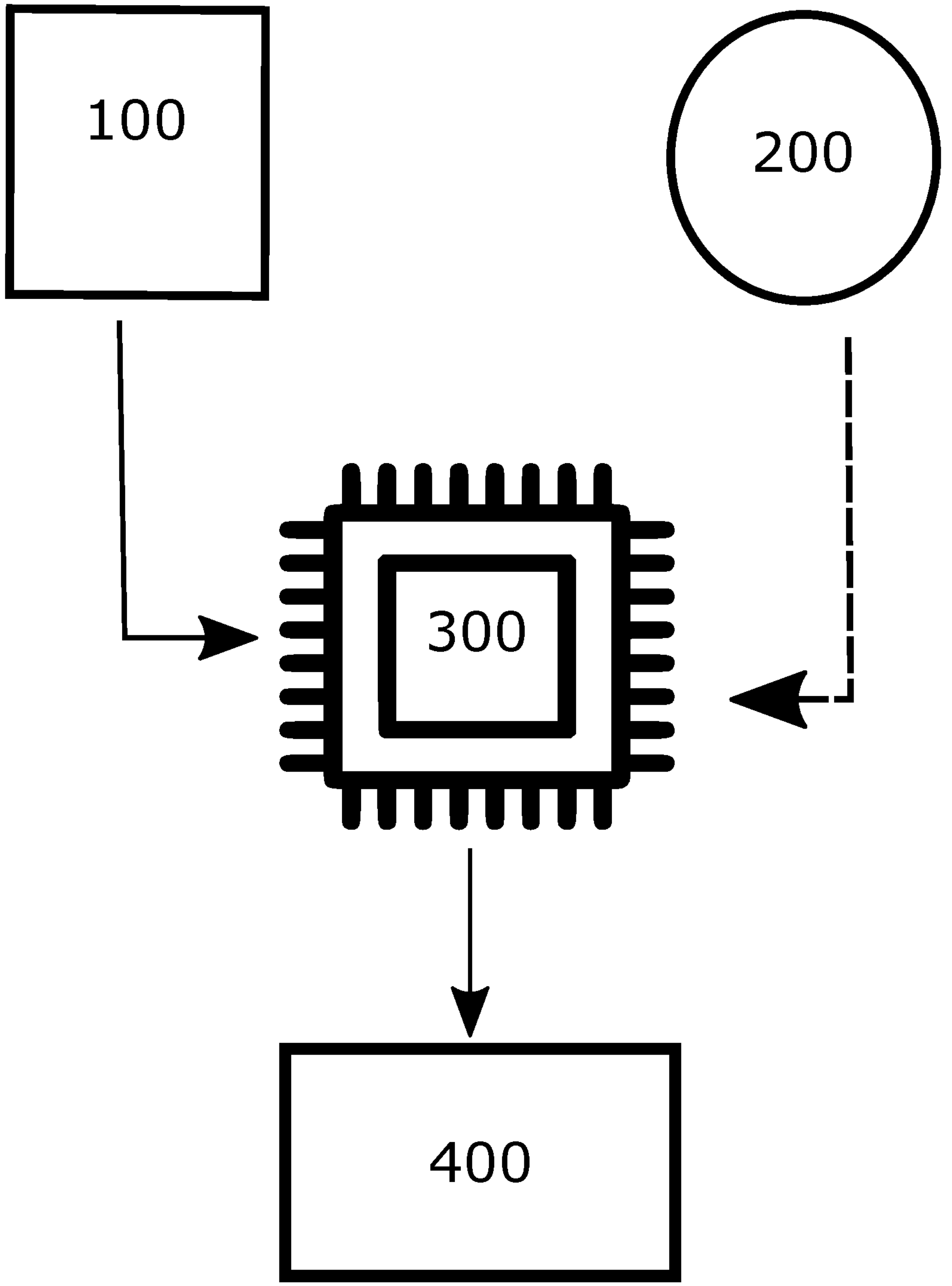

FIG. 9 is an illustration of a classifier and a reconstruction architecture according to the present invention;

FIG. 10 exemplifies a distribution of classes of trains in latent space according to one embodiment;

FIG. 11 shows an example of a train classifying system in accordance with the present invention.

DETAILED DESCRIPTION OF THE DRAWINGS

It is noted that not all the drawings carry all the reference signs. Instead, in some of the drawings, some of the reference signs have been omitted for sake of brevity and simplicity of illustration. Embodiments of the present invention will now be described with reference to the accompanying drawings.

Figure 1:
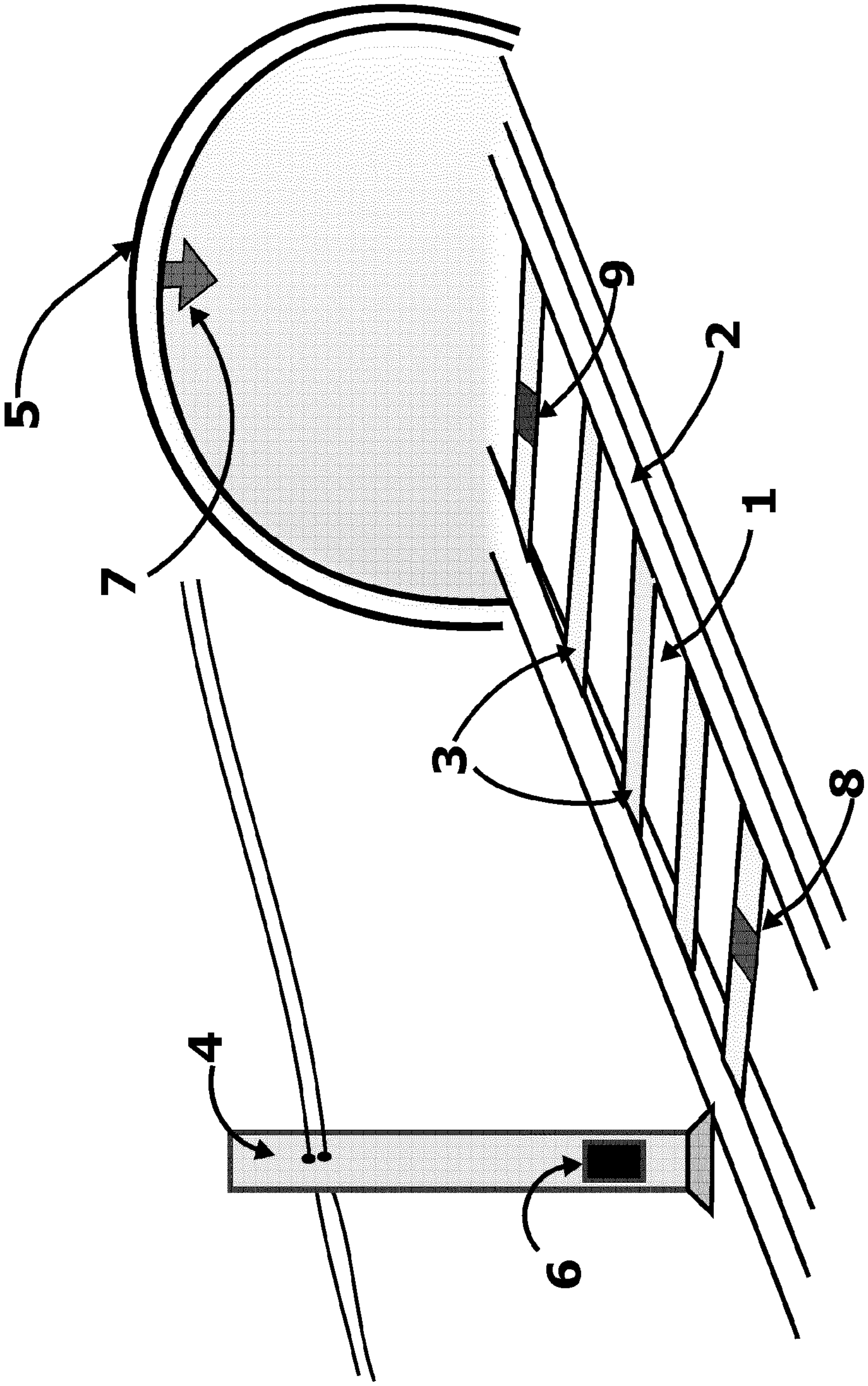
FIG. 1 depicts an example of a set-up of several data collecting sensors to a railway infrastructure in accordance with the present invention.

FIG. 1 provides a schematic description of a system configured for a railway infrastructure. There is shown an example of a railway section with the railway 1 itself, comprising rails 2 and sleepers 3. Instead of the sleepers 3 also a solid bed for the rails 2 can be provided. Moreover, a mast 4 is shown that is just one further example of constructional elements that are usually arranged at or in the vicinity of railways. Also, a tunnel 5 is shown. It is needless to say that other constructions, buildings etc. can be present and also used for the present invention as described before and below. A first sensor 8 can be arranged on one or more of the sleepers 3. The sensor 8 can be an acceleration sensor and/or any other kind of railway specific sensor. Examples have been mentioned before.

A second sensor 9 is also arranged on another sleeper distant from the first sensor 8. Although it seems just a small distance in the present example, those distances can range from the distance to the neighbouring sleeper to one or more kilometres. Other sensors can be used for attachment to the sleepers as well.

Another kind of sensor 6 can be attached to the mast 4 or any other structure. This could be another sensor, such as an optical, temperature, even acceleration sensor etc. A further kind of sensor 7 can be arranged above the railway as at the beginning or within the tunnel 5. This could be height sensor for determining the height of a train, an optical sensor, a doppler sensor etc. All those sensors mentioned here and before are non-limiting examples.

Figure 2:
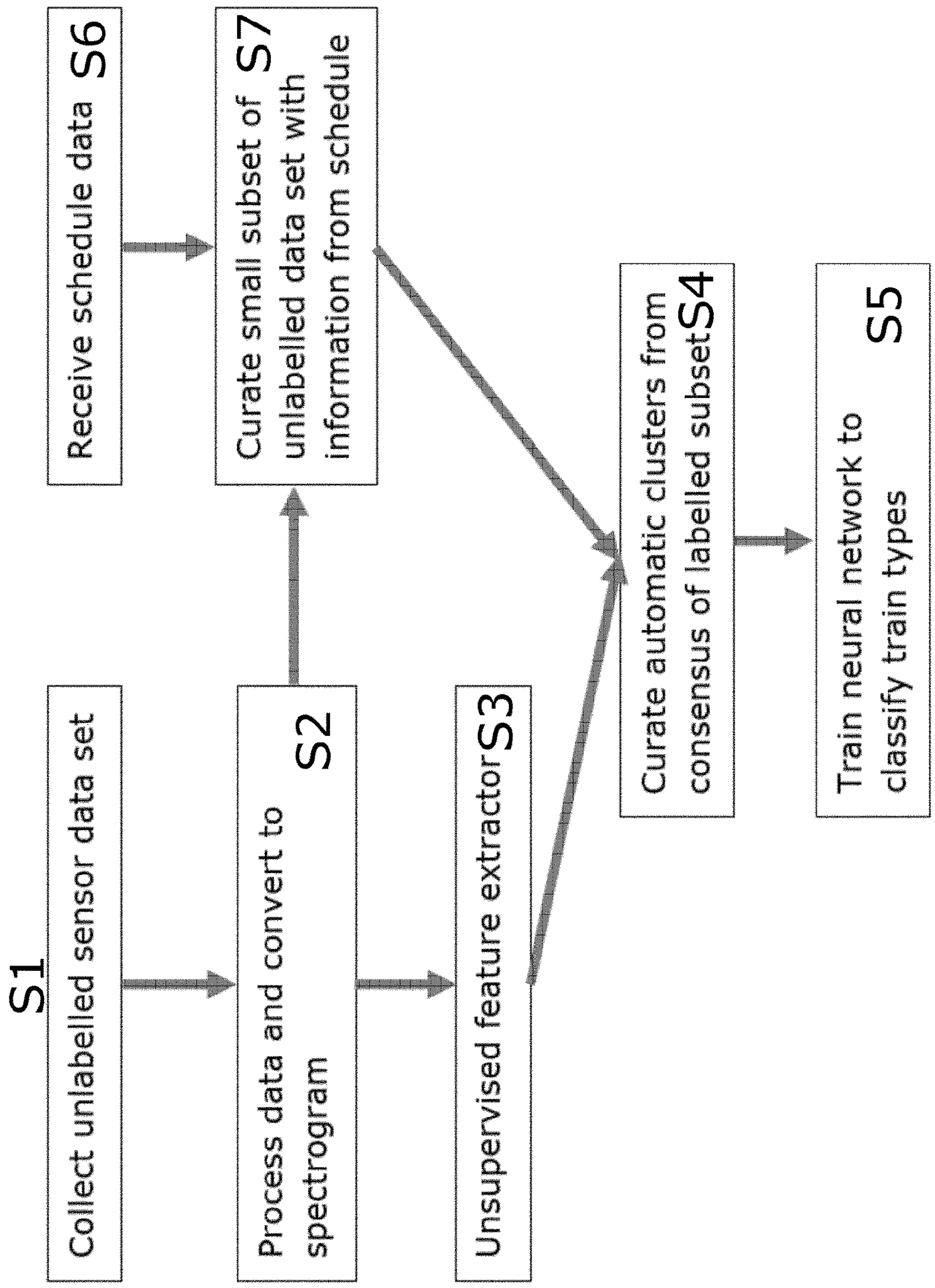
FIG. 2 shows a schematic flowchart of analysing railway related vibration data according to one embodiment of the present invention.

FIG. 2 is intended to provide an example of a method for analysing railway related vibration data. Sensors 8 and 9 can be connected to a common component such as a server. The server can be a remote server. The server can be a part of an edge device. The server can further comprise a plurality of servers, cloud computing, cloud storage etc. The server can be transmitting, storing and/or processing etc. The server can be pulling or pushing sensor data from at least one of the sensors 8 and 9. The sensor to server connection can be hard-wired and/or wireless, depending on the needs and the further infrastructure. In S1 server can be collecting and/or pulling in unlabelled sensor data. Unlabelled sensor data can consist samples of acceleration traces. The acceleration traces can consist vibration measurements. The unlabelled sensor data can comprise the acceleration traces that have not been tagged with labels identifying characteristics, properties, or classifications. For example, an acceleration trace of a train recorded by the sensor without information about the train.

In S2, the method can comprise a step of processing the sensor data and converting it to a spectrogram. The method can comprise providing a processing unit configured to process the sensor data. Processing sensor data can comprise converting all the acceleration traces to the same length which can be achieved by cutting off the edges. The cutting of the edges can comprise the method flagging or cropping the trace if the RMS value is lower than a pre-determined acceleration value. The process is further described in the later embodiments.

The processing can also comprise discarding traces. If a trace is longer than a pre-determined time or lower than a pre-determined RMS value it can be discarded. For example, traces longer than 14 seconds can be cargo trains and can be excluded from classification. Further, the method comprises converting the traces to spectrograms. A spectrogram can be a time-frequency representation of an acceleration trace. The spectrogram can split an acceleration trace or a signal into overlapping windows. Further, a power spectrum density (PSD) of the Fourier transform can be calculated. To obtain constant energy per channel Slaney-style Mel scale can be used. The power spectrum density can then me mapped onto the Mel scale. The next step can be to take the logs of the PSDs at each of the Mel frequencies.

The processing can also comprise constraining the features of the input within a finite region. This is important because the classifier (as described later) can calculate the distance between two points by the Euclidean distance. If one of the features has a broad range of values, the distance will be governed by this particular feature. Therefore, a finite region can be specified so all features can be normalized such that each feature contributes approximately proportionately to the final distance. A global-maxima and/or a global-minima can be calculated from a first dataset.

The method can further comprise step S3 for extracting features in an unsupervised manner. The method can comprise learning an embedding for the first data set for dimensionality reduction by training the method to ignore noise. This can be used to group, or segment, datasets with shared attributes in order to extrapolate algorithmic relationships. This can identify commonalities in the data and reacts based on the presence or absence of such commonalities in each new piece of data. Each group can be called a cluster.

In some embodiments the method comprises providing a scheduling database. The scheduling database can comprise at least one time table of a train. In step S6, the processing unit can comprise receiving the schedule data from the scheduling database. The scheduling database can be configured to be updated automatically or semi automatically. In one exemplary embodiment the method can comprise a step, shown in S7 of curating a small subset of unlabelled data in S2 with the schedule data. Data curation can comprise integration of a subset of data collected from the sensor and the schedule data. A subset of unlabelled data collected from the sensor can further be labelled using the information from the schedule data.

In some embodiments step S4 can comprise labelling the clusters created in S3 automatically using the information from the labelled subsets from S7. Cluster labelling can further comprise examining the features of the labelled data set per cluster to find a labelling that summarizes a class of each clusters and further can distinguish the cluster from each other.

The method can further comprise S5 of training a neural network to classify train type on the basis of the labelled and/or unlabelled clusters. The training can be done such that when a ‘new’ unlabelled acceleration trace is fed into the classifier it can predict a likelihood for a train being a certain type. The training can be done in a weekly supervised manner, such that the noise in the labels can be adjusted for.

Figure 3:
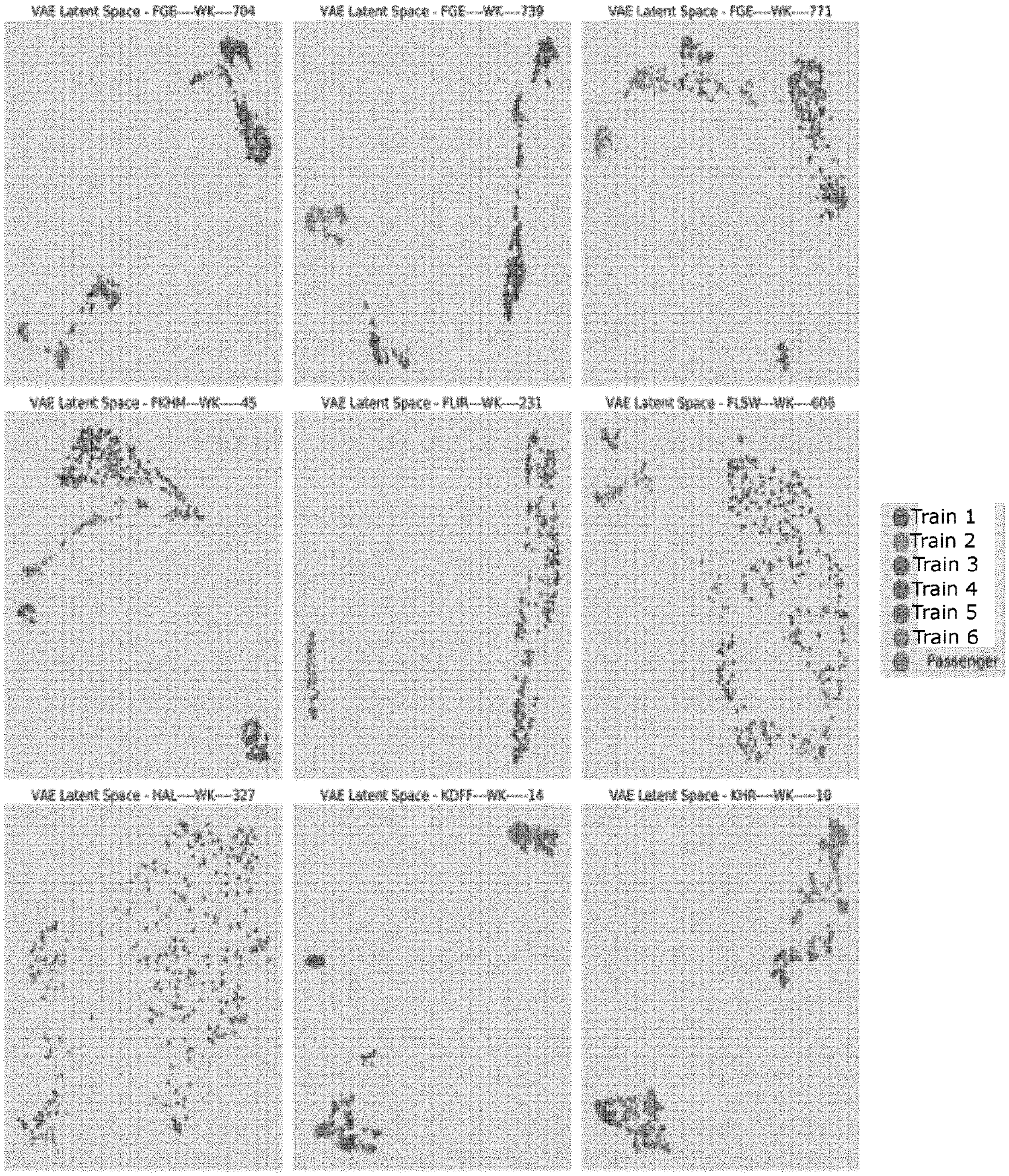
FIG. 3 exemplifies a distribution of classes of trains in latent space according to one embodiment.

FIG. 3 exemplifies a distribution of classes of trains in latent space according to one of the embodiments of the present invention. The method can comprise of distributing the types of trains in a latent space. The visualization in FIG. 3 is shown simply as an indication and should not be taken literally, as the actual embedding space is a higher dimension tensor which is compressed to two dimensions for representation in FIG. 3. However, as can be seen in the distribution, some train types are better separated than others, and the encoding is better in some sensors that in others.

The latent space, feature space, embedding space representation can comprise a compressed representation of multi-dimensional data and the terms can be used interchangeably. The latent space representation can be a representation of variables that are inferred through an algorithm from other variables that are observed directly. The visualization in FIG. 3 can be created by mapping a high dimensional space to a 2D space while keeping the distance between the features (data points) the same.

Figures 3A, 4:
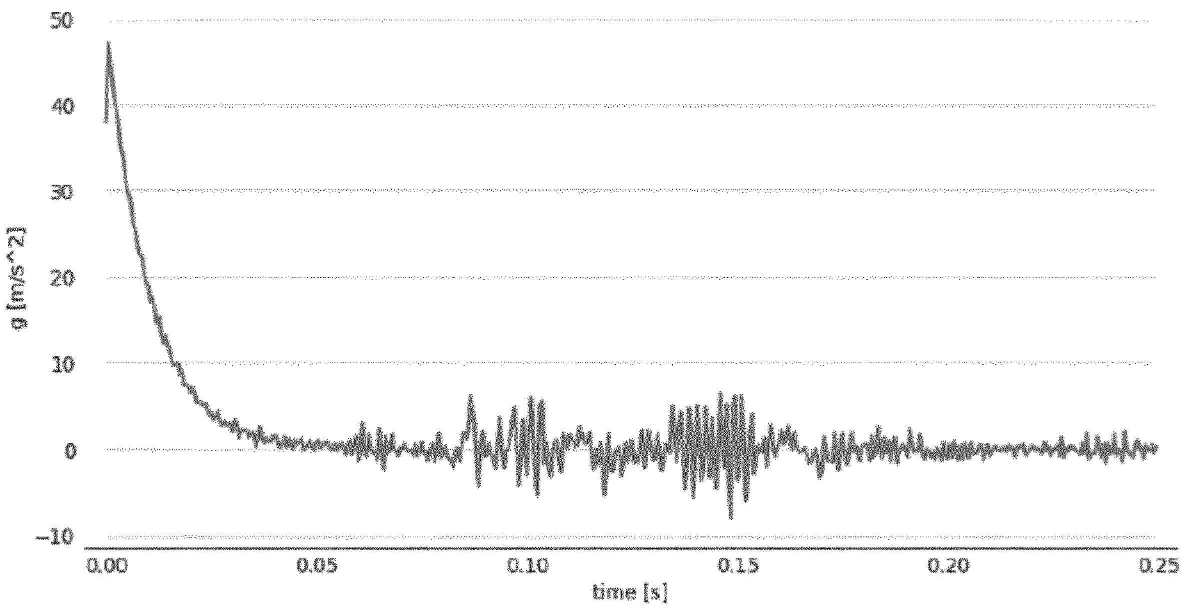
FIG. 3*a* shows a tabular representation of a classification of trains according to FIG. 3.
FIG. 4 is an exemplifying trace of acceleration recorded with long wakeup curve.

FIG. 3*a* is a tabular representation of the classification report of the information derived from FIG. 3 and shows the performance results of an autoencoder used. The precision can be a measure of how accurate the prediction is. The precision can be a number describing the ability of the classifier not to label as positive a sample that is negative (false positive).

The recall or sensitivity can be the ability of the classifier to find all the positive samples for example, the classifier is recognising 4 Train 1 in a trace containing 12 Train 1 and 2 Train 6. Of the 4 identified as Train 1, 3 actually are Train 1, while the remaining 1 is a Train 6. The classifier's precision in this case can be 0.75 while its recall can be 0.25.

The f1-score can be a weighted harmonic mean of the precision and recall. The support can be the number of occurrences of each class. The class can be type of a train. For example, Train 1 can be one type or class. Train 2 can be another type or class, etc.

FIG. 4 is an exemplifying trace of acceleration recorded at one of the sensors. In some embodiments the sensors can go to an inactive state in absence of any activity or train passing. The wakeup mode can be a limited bandwidth mode of operation. In this mode, acceleration can be measured a few times per second. When the sensor senses the presence of motion it can automatically switch to a full-bandwidth measurement mode which can result in a long wakeup curve. In the following embodiment an exponential curve can be fitted to the first 50 points of the acceleration trace. The weight of the regression can be inversely proportional to the index of a point, such that, the first point in the regression can be weighted 50 times higher than the last point. In some examples the measure acceleration can be a mixture of the wakeup curve and the ‘real signal’. The weight of the real signal increases with time. If there is no real signal or presence of a passing train/motion the exponential can simply get a very large negative exponent. This negative exponent and/or the exponential wakeup can be removed. The removing can be done automatically by a processing unit.

FIG. 5*a* is an exemplifying trace of acceleration recorded with a signal tapering off to zero after the removal of exponential wakeup as discussed in FIG. 4 according to the present invention. The sensor can continue to record for a further 0-10 seconds in order to determine that the train has passed. This can result in a dead signal at the end. This dead signal or trail can be removed to have more precise or accurate data.

FIG. 5*b* is an exemplifying trace of acceleration after the trail (as discussed in FIG. 5*a*) is flagged or removed. It is important to alter, replace or delete the ‘irrelevant’ or inadequate data to increase the efficiency of the classifier. This can be done by comparing a moving average of the root mean square (RMS) value of the trace, starting from the edge of the trail, with a pre-determined threshold value. Further, everything before the first point where the threshold is breached can be discarded.

Figure 5:
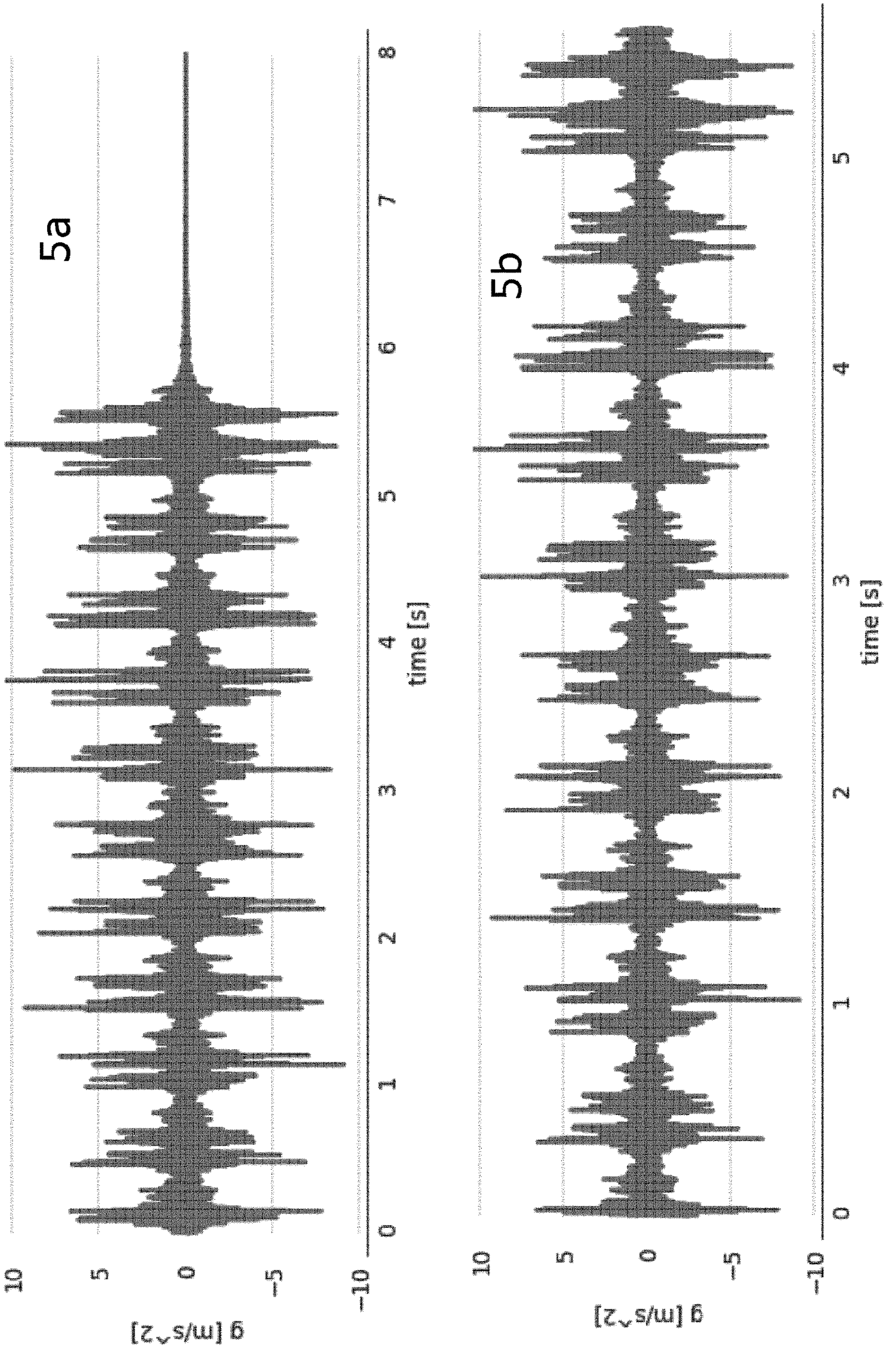

As discussed in FIG. 4 and FIG. 5 the traces can be cleaned. The cleaning will imply altering, replacing or deleting at least one signal from the trace. The data cleaning can clean, remove, alter any errors, outliers, or duplicates. This can also remove ‘irrelevant’ or noisy data.

After the data has been cleaned or pre-processed it can now be stretched to a standard size. In FIG. 6 and FIG. 7 an exemplifying representation of acceleration traces of two trains can be seen. FIG. 6*a* and FIG. 7*a* shows an acceleration trace of Train 1 recorded on sensor ID FGE WK 704 and Train 3 recorded on the same sensor in WK 706 respectively.

FIG. 6*b* and FIG. 7*b* shows a visual representation of the spectrum of Mel frequencies of the acceleration trace of the two trains (Train 1 and Train 3) as it varies with time. The Mel spectrogram can be a representation of the power spectrum based on linear cosine of a log power spectrum on a nonlinear Mel scale. The Mel scale can be a quasi-logarithmic spacing of frequencies resembling the resolution of the human auditory system. In particular, Slaney-style Mel scale can be used to obtain constant energy per channel. The parameters for plotting the spectrogram can be found from hyperparameter optimization of at least one truth set. For example, parameters used in this embodiment are as follows:

Number of Mel: $2^6=64$

Fast Fourier transfer window size: $2^{10}=1024$

Window forward skip: $2^8=256$

Window type: Hann

The data cleaned or removed at this step can be stored and be used in other embodiments.

FIG. 8 is visualizations of classier architecture according to the present invention.

FIG. 8*a* is an exemplary classifier according to an embodiment of the present invention. It shows an exemplary down-sampling via a convolution with stride two 10, 11, 12, 13 and an additional residual filter bank 20, 21, 22, 23. The Mel spectrum can be a matrix of pixel values. Further, a 'filter' or 'kernel' or 'feature detector' can be used to create an 'activation map' or a 'feature map'. The different values of the different matrices can produce different feature maps for the same input Mel spectrum. The convolution of a second filter on the same image can create a second feature map. The method can learn the values of these filters on its own during the training process. The number of filters can be proportional to the number of features extracted which can facilitate pattern recognition. The depth of a feature map can correspond to the number of filters. The stride can be the number of pixels by which a filter can be shifted across an input matrix. The activation layer applied can be the softmax activation layer 60. Further, a batch normalization layer 40 and a dropout layer 70 can be applied. The dropout layer can be configured with a rate of 0.5. The softmax function can squash the output of each neuron to be between 0 and 1, just like a sigmoid function. The softmax function can further divide each output by a factor such that the total sum of the outputs can be equal to 1. Mathematically, a softmax function can be defined as:

$$\sigma(Z)_j = \frac{e^{Z_j}}{\sum_{k=1}^{K} e^{z_k}},$$

where Z can be a vector of the inputs to the output layer, j can be the indices of the output units. A full classifier can comprise at least one of the at least one classifier architecture and at least one fully connected layer, which can result in the classification. The fully connected layers can connect every neuron in one layer to every neuron in another layer.

FIG. 8*b* is an exemplary filter bank architecture comprising a sigmoid activation layer 50. It shows an exemplary filter bank architecture composed of a 1×1 convolution. An additional operation called ReLU (Rectified Linear Unit) 30 can be applied. ReLU can adjust activation values to be within a pre-determined range. The range can be 0-1 or 0 to +∞, etc. The ReLU can be configured to replace all negative pixel values in the feature map by zero. The split can be applied, and the input matrix can be split into two identical matrices. One of the feature layers can comprise the sigmoid activation 50. Sigmoid activation can operate on a sigmoid function. The sigmoid function can be:

$$\phi(Z) = \frac{1}{1+e^{-Z}},$$

where Z can be a vector of the inputs to the output layer.

The input layer or input matrix can comprise pixels which can also be interpreted as neuron activations. These neurons can be scaled or normalized by a batch normalization layer 40. The normalization can be such that no activation deviates more than a 'standard deviation' of the activation strength. It can further allow each layer of a network to learn by itself a little bit more independently of other layers.

FIG. 9 is a diagram illustrating the process through which the classifier architecture creates an embedding, and the subsequent reconstruction of the image from the embedding. The method can comprise providing a decoder. The decoder can be configured with up-sampling with stride 2. This reconstruction can further be used to test the information contained in the embedding.

FIG. 10 shows the distribution of train types in three different switches. The classification results can be plotted in FIG. 10 after the embedding. It may be noted that the two-dimensional display is for visualization purpose only and is not the real picture. The real latent space can be a 4×4×32=512-dimensional tensor.

FIG. 11 shows an example of a train classifying system on the basis of the railway related vibrational data. The system can comprise sensor data 100. The sensor data can be vibrational patterns recorded from the acceleration of the train. The system can further comprise a scheduling database 200. The scheduling database can comprise automated or semi-automated extraction of the train schedule information. The system can further provide a processing unit 300. The processing unit can be configured to pull the sensor data and convert it into a classifier 400 acceptable format. The classifier 400 acceptable format of schedule database and/or the sensor data can comprise acceleration traces converted to spectrograms at a pre-determined frequency. The processing unit can additionally be configured to curate at least some part of the sensor data with the scheduling information. The system can further comprise pushing the processed data from the processing unit 300 to a classifier 400. The classifier can be configured with machine learning methods to extract at least one 'feature' from the processed data. The classifier according to the method described in the present invention can also be configured to predict a likelihood of a train being of a certain type.

The invention claimed is:

1. A method for predicting train types, the method comprising:

collecting at least a first dataset from a sensor applied to railway infrastructure, wherein the sensor is an accelerometer configured to collect sleeper acceleration data, collecting at least a second dataset from a scheduling component, curating at least one subset of the first dataset with the second dataset to obtain a first training database, automatically converting the first data set to at least one time-frequency spectrogram, wherein the at least one time-frequency spectrogram is a Mel-spectrogram for which the parameters have been generated by performing hyperparameter optimization of a truth set, unsupervised encoding of the at least one time-frequency spectrogram to at least one feature map, automatically calculating at least one nearest sample neighbour in the at least one feature map and iteratively extending a label from the at least one subset of the first dataset to the at least one nearest sample neighbour, and predicting at least a likelihood of one train belonging to at least one train-type using the first training database.

2. The method according to claim 1 further comprising connecting the at least one sensor to at least one server, wherein the server comprises at least one processing component.

3. The method according to claim 2 comprising pre-processing the first dataset, in the at least one processing component.

4. The method according to claim 3, further comprising automatically generating at least one acceleration trace associated with the first data set, wherein the pre-processing further comprises at least one of:

flagging at least one noisy component of the first dataset, removing at least one exponential wakeup, cutting off the edge of the at least one acceleration trace, stretching the at least one first dataset to a pre-determined size, representing the at least one first dataset as a time-frequency spectrogram.

5. The method according to claim 4 comprising using the pre-processed first dataset for predicting the likelihood of the train being of a certain type.

6. The method according to claim 2 comprising facilitating the at least one processing component with a neural network (NN) component, wherein the NN component is configured to automatically learn at least one lower-dimensional feature map.

7. The method according to claim 6 further comprising teaching the NN component the at least one lower-dimensional feature map.

8. The method according to claim 1, wherein the at least one feature map is a lower-dimensional feature map, wherein the method comprises automatically calculating at least one nearest sample neighbour in the lower-dimensional feature map.

9. The method according to claim 1 further comprising using the at least one feature map and the second dataset to label the at least one subset of the first dataset.

10. The method according to claim 1, wherein the second dataset comprises scheduled data, and wherein curating the at least one subset comprises curating unlabeled data with the schedule data comprising labeling the at least one subset collected from the sensor using information from the schedule data.

11. The method according to claim 1, wherein the at least one feature map is a lower-dimensional feature map, the method further comprising-predicting the likelihood of a train being of a certain type using the lower dimensional feature map.

12. The method according to claim 1 wherein predicting the train-type comprises predicting any of a speed of the train, a length of the train, or a type of wagons of the train.

13. A train classification system, the system comprising:

a sensor configured to provide at least a first dataset and configured to be applied to railway infrastructure, a scheduling component configured to provide at least a second dataset, a server configured to curate at least one subset of the first dataset with the second dataset to obtain a first training database, a processing component configured to classify at least one train type, wherein, the system is configured to execute a method according to method claim 1.

14. The method according to claim 1 comprising further associating at least one weight with at least one distinctive feature of the train.

15. The method according to claim 1, wherein the first data set comprises a vibration signal and, wherein the vibration signal comprises at least one of:

at least frequency data;

at least displacement data;

at least velocity data; or at least acceleration data.

16. The method according to claim 1 further comprising extracting at least one feature map from the first dataset and further comprising extracting a feature map related to an observed environment of the sensor.

17. The method according to claim 1 further comprising automatically generating at least one acceleration trace associated with the first dataset and automatically converting the at least one acceleration trace to at least one time-frequency spectrogram.

18. The method according to claim 17 further comprising scaling at least one spectrogram value within a pre-determined region.

19. A method for automatically generating a labelled training dataset for railway train-type classification, the method comprising:

collecting an unlabelled first dataset of acceleration traces from an accelerometer applied to railway infrastructure, collecting schedule data from a scheduling component identifying train arrivals at a location associated with the accelerometer, curating a subset of the unlabelled first dataset by associating acceleration traces in the unlabelled first dataset with the schedule data to obtain a labelled subset, converting the acceleration traces to Mel-frequency spectrograms, unsupervised encoding the Mel-frequency spectrograms to generate a lower-dimensional feature map, and automatically extending labels from the labelled subset to nearest neighbours in the lower-dimensional feature map, thereby obtaining a labelled training dataset for use in train-type classification.

* * * * *